Aug. 17, 1937.  H. BENDER  2,089,937
GAS REACTION APPARATUS
Filed Oct. 23, 1935   3 Sheets-Sheet 1
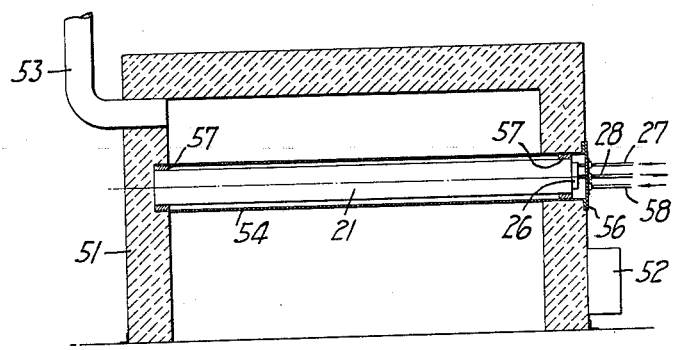
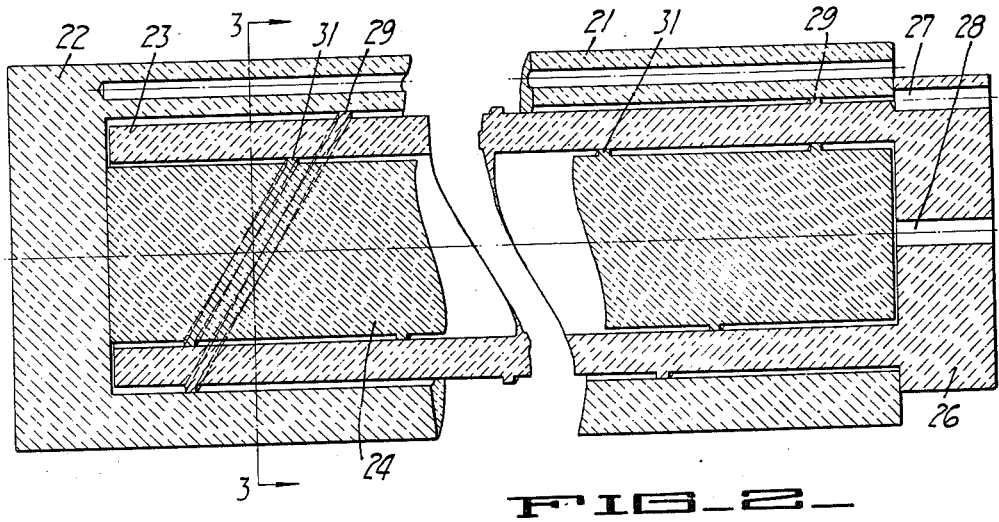
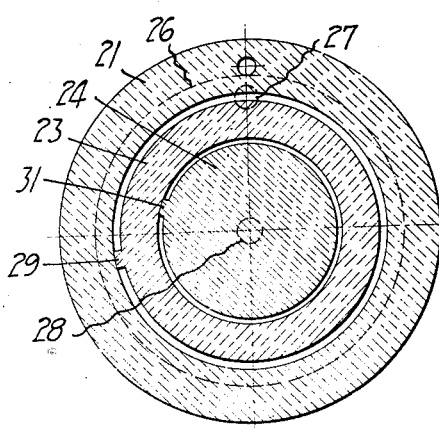
INVENTOR.
Harry Bender
BY Robert H. Eckhoff
ATTORNEY.

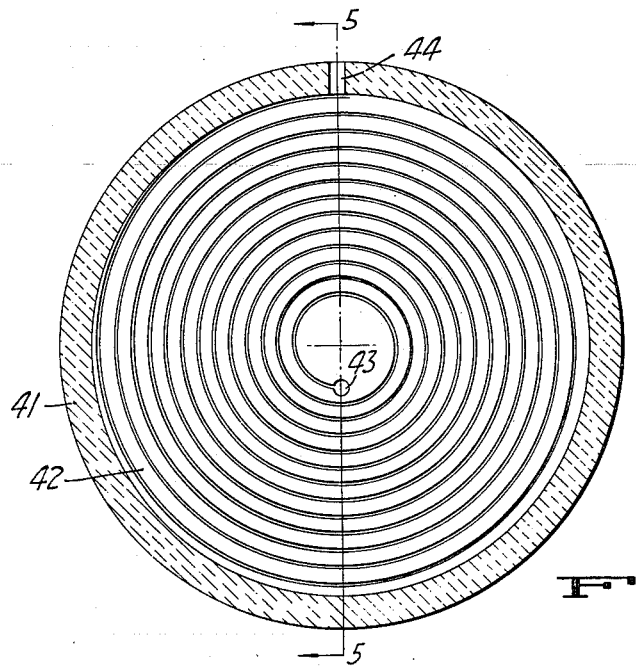
FIG_4_
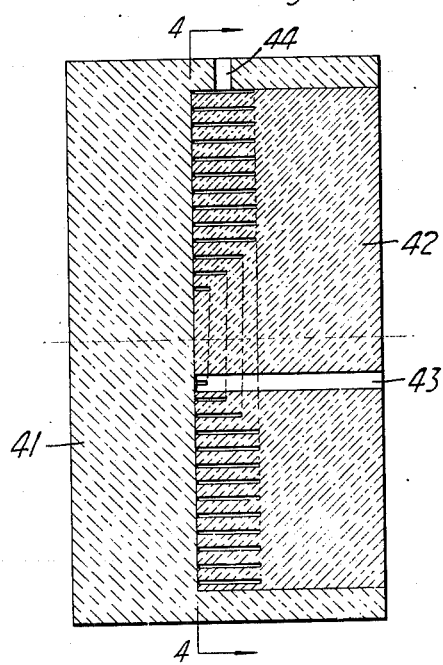
FIG_5_
INVENTOR.
Harry Bender

Aug. 17, 1937.  H. BENDER  2,089,937
GAS REACTION APPARATUS
Filed Oct. 23, 1935  3 Sheets-Sheet 3
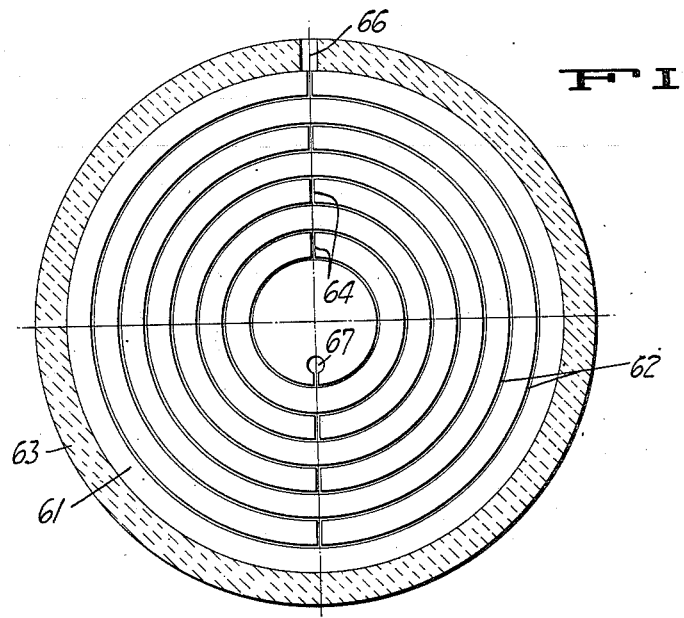
FIG_6_
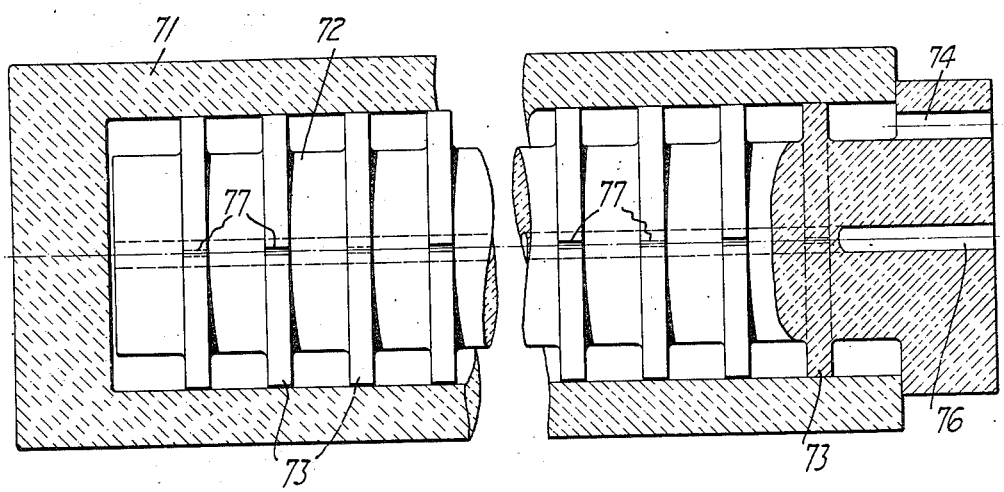
FIG_7_
INVENTOR.
Harry Bender
BY Robert H. Eckhoff
ATTORNEY.

Patented Aug. 17, 1937

2,089,937

UNITED STATES PATENT OFFICE 2,089,937

GAS REACTION APPARATUS

Harry Bender, Antioch, Calif., assignor to Great Western Electro-Chemical Company, a corporation of California Application October 23, 1935, Serial No. 46,269

7 Claims. (Cl. 23—277)

This application is a continuation in part, and in part a division, of application Serial No. 744,337 filed September 17, 1934, and application Serial No. 16,285 filed April 15, 1935.

This application has to do with an apparatus useful for carrying out gas reactions, particularly those reactions exothermic in nature as that wherein a hydrocarbon, particularly saturated aliphatic hydrocarbons having less than five carbon atoms, as methane is chlorinated with chlorine to form a product as carbon tetrachloride. This specific reaction is catalyzed by light and in fact can become self-catalyzing for the reaction itself tends to go under some conditions with a luminous flame. I have determined that this self-catalyzation of this reaction is undesirable inasmuch as it causes the reaction to increase in rate to such an extent that localized overheating becomes present and side reactions enter in giving rise to the formation of free carbon. This carbon is deposited in the reaction apparatus and, if the reaction continues at the high rate, the carbon builds up and eventually stops the flow of gas into the apparatus. The carbon also provides local points of overheating furthering the undesired side reaction quickly.

It is in general the broad object of the present invention to improve upon gas reaction apparatus, particularly that apparatus utilized to carry out the reaction of methane with chlorine to give carbon tetrachloride.

In carrying out the chlorination of methane to form carbon tetrachloride, I have found that the presence of any catalyst is undesirable. Thus I avoid the use of light or of materials tending to increase the rate of chlorination of the methane. As a matter of fact, after years of research upon this reaction, I can fairly state that the major problem in carrying out the reaction on a commercial scale is one of maintaining the reaction under such conditions that it goes at a relatively slow rate instead of at a high rate. To this end I have found the use of a black body reaction chamber of advantage since such a chamber, particularly if of a high specific heat, tends to adsorb quickly any light generated by the reaction as well as any excessive local temperatures. Such a black body I have found to be graphite. Since this material is relatively porous and since chlorine is corrosive, I preferably treat the graphite to reduce its porosity. This I accomplish by impregnating it with a material which is thereafter set in the graphite body to reduce the porosity thereof.

A further object of the present invention is to provide a suitable reaction chamber material, particularly one suited for the chlorination of methane to carbon tetrachloride.

The invention possesses numerous other advantageous features and objects of advantage, some of which, together with the foregoing, will appear hereinafter, wherein the present preferred apparatus is disclosed.

In the drawings accompanying and forming a part hereof:

Figure 1 is a side elevation, partly in section, showing the apparatus of Figures 2 and 3 assembled for carrying out a reaction of the type herein dealt with.

Figures 2 and 3 are respectively sections through an assembled unit of an apparatus, Figure 3 being on the line 3—3 of Figure 2.

Figures 4 and 5 are respectively sections on the line 4—4 and 5—5 of the figures mentioned.

Figure 6 is a plan view, partly in section, of another apparatus.

Figure 7 is a side elevation, partly in section, of another apparatus.

As appears in Figures 2 and 3, I provide a cylinder 21 having an integral end 22 thereon. An annular insert member 23 is inserted into the cylinder 21 while a plug 24 is inserted into the annular insert 23. The annular insert 23 has a head 26 thereon through which extends an inlet 27 and an outlet 28. Gas is admitted through the inlet 27 to pass between the cylinder 21 and the insert 23, then between the cylinder end and the insert to return along the plug 24 on the inside of the annular insert to the outlet 28.

Means are provided between the several units to maintain flow conditions through the apparatus under the conditions of turbulent flow so that any tendency for localized overheating is largely obviated and good thermal contact is maintained. In the form disclosed this means comprises a screw thread formed upon the exterior surface of the annular insert 23. This screw thread is of a size such that it abuts against the cylinder 21. A screw thread 31, preferably running in the opposite direction to screw thread 29, is placed upon the plug 24 so that the plug abuts against the inside of the annular insert 23. The plug is spaced from the head 26 and the insert 23 from the end 22 to provide gas passages therein.

The annular insert is preferably tapered from the right hand side of Figure 2 to the left hand side thereof, the annular insert being preferably spaced from the cylinder a very short distance at the right hand end, about 1/32 of an inch, while the space is increased uniformly to about 3/32 of an inch at the left hand end in a five-foot cylinder. The plug 24 is likewise tapered from a clearance of about 1/8 of an inch at the left hand end to about 3/32 of an inch adjacent the outlet. The clearance near the head 26 is small so the head is maintained hot. This starts the reaction early to create chlorinated methanes in the gases acting as diluents.

As a material for the construction of the cylinder, the annular insert and the plug, I preferably use graphite in the case of reacting methane and chlorine since this material is a black body, has a high specific heat and high thermal conductivity, and can be made so that its porosity is very low. For other gas reactions, where corrosive conditions are not present or where the reacting materials are exothermic, other materials can be employed. For example, the units described can be made of metals or can be metal exteriors, lined or coated with protective coatings such as glass, lead, enamels, paints, or other corrosion resisting materials such as rubber. In the case of chlorine and methane, carbon and carborundum bodies can be employed, although they are not nearly as suitable as graphite.

It is to be noted that in the apparatus disclosed, the reacting gases sweep between the graphite bodies in counter-current so that relatively cold incoming gases are heated by the warmer gases which have undergone reaction. Heat control is thus facilitated and simplified. This is particularly so inasmuch as turbulent flow is maintained through the chamber.

When the apparatus is employed as a clean-up reaction chamber, to carry to completion a reaction substantially complete, the plug 24 can be omitted and the annular insert filled with chunks of graphite or other suitable material so that an increased time of passage results as well as a lowering in the back pressure.

As is disclosed in my copending application Serial No. 11,251 filed March 15, 1935, the graphite is preferably impregnated with a silicate to render it dense by flowing through the body an aqueous silicate solution. The density of the silicate solution is gradually increased until finally a very concentrated solution is being passed through the body. The flow of silicate is then stopped and the graphite body dried, thereafter being subjected to a temperature of about 360° C. If it is desired at this time to free the graphite body of metals, a desirable step if the body is to be used in the chlorination of methane, hot, dry chlorine is passed through the body at a temperature of about 360° C.

In Figures 4 and 5 I have shown another form of apparatus in which a body 41 is provided with a recess in which is inserted a body 42. The fit between the two bodies is very close. As appears in Figure 5, the body 42 has a spiral groove increasing in depth from inlet 43 and extending spirally outward to the outlet 44. The spiral groove is of such a size that it creates turbulent flow in the gases passing therethrough, thus attaining the advantages attendant upon this type of flow condition.

In Figure 1 I have shown the apparatus disclosed in Figures 2 and 3 assembled and in place in a furnace 51. The furnace as shown is typical of a heat exchange apparatus although the furnace can be substituted with cooling means if the reaction is so exothermic that this is necessary. For the reaction between methane and chlorine the supplying of some heat is necessary to initiate reaction conditions and to maintain equilibrium conditions. Heat for this furnace is supplied by a burner 52, for example, while the products of combustion leave through a stack 53. The chamber 21, together with its assembled unit, is supported in a metal shell 54 supported on the furnace walls. The front end of the shell is closed by a cap 56 and the chamber 21 is supported in a spaced relation to the shell by spacers 57. Methane under pressure is introduced through pipe 58 to shell 54 to insure that any leakage is constituted of methane into reacting chamber rather than of a mixture of methane and chlorine out of the chamber.

In Figure 6 I have shown another form of apparatus, much like that in Figures 4 and 5, wherein a body 61 is provided with a plurality of concentric grooves 62. This body is adapted to fit in the recess provided in another body 63 as in Figures 4 and 5. The several groups are connected to provide a labyrinth by groove 64, these grooves being so placed that the gases must sweep completely around the body to the other side to pass on. The body is provided with an inlet 66 and an outlet 67, the inlet preferably being on the outside so that the initial reaction heat, usually the greatest heat, is easily and quickly removed.

In Figure 7 I have shown another form of apparatus, much like that disclosed in connection with Figure 2, wherein a chamber 71 is provided to receive an annular insert 72. The insert is a plug tapered from right to left and provided with a plurality of rims 73. These rims are of sufficient extent to maintain the cylinder and its insert in good thermal contact and at the same time prevent gases from sweeping through from the inlet 74 to the outlet 76. Each rim is grooved as at 77 but adjacent rims are grooved on opposite sides so that the gases must at least make a half revolution before passing on to the space between the next adjacent rims.

Depending upon the type of reaction for which the apparatus is employed, any one of the foregoing apparatuses may be suitably enclosed in the metal shell 54 in the assembly shown in Figure 1. Instead of being made of graphite, the bodies can be made of other material. For example, one of the exothermic reactions with which the apparatus of my invention is particularly useful is that wherein a hydrocarbon is burned to form an aldehyde. In this case, I have found that copper is a desirable material and any one of the foregoing pieces of equipment can be made of copper to carry out this reaction. Specifically the mixture of hydrocarbon, such as butane and air, is supplied to the inlet while the whole apparatus, assembled as in Figure 1, is maintained at a suitable temperature.

The apparatus disclosed is also suitable for the carrying out of complex reactions. For example, a mixture of hydrocarbon to be nitrated to form nitrated paraffines including nitromethane is introduced into inlet 27 in Figure 1. The nitrating agent is either nitric acid or an active oxide of nitrogen capable, under the conditions of the reaction, of forming a considerable percentage of nitromethane. For this reaction I prefer to use the carbon bodies previously described in connection with the manufacture of carbon tetrachloride. As a hydrocarbon, a paraffine hydrocarbon higher than methane is employed and ethane, butane, or propane can be used. These hydrocarbons, under the conditions of the reaction, become nitrated and crack as well, to form the lower members of this hydrocarbon series so that a percentage of nitromethane is formed in the exit gases.

The nitromethane can be recovered separately from the other bodies present and chlorinated later by the method disclosed in the Ramage Patent 1,996,388 of April 2, 1935.

I claim:

1. In a gas reaction apparatus, a hollow graphite cylinder, an annular graphite insert in said cylinder, a graphite plug insertable into said annular insert, a screw thread formed on the outside of said insert and extending between said cylinder and said insert and engaging one with the other to provide a first reaction space, and another screw thread formed on the outside of said plug and extending between said annular insert and said plug and engaging one with the other to provide a second reaction space.

2. In a gas reaction apparatus, a hollow graphite cylinder, an annular graphite insert in said cylinder, a graphite plug insertable into said annular insert, a screw thread formed on the outside of said insert and extending in one direction between said cylinder and said insert and engaging said cylinder with the insert to provide a first reaction space, and another screw thread formed on the outside of said plug and extending in another direction between said annular insert and said plug and engaging said insert with the plug to provide a second reaction space.

3. In a gas reaction apparatus, a hollow silicate impregnated graphite cylinder, an annular silicate impregnated graphite insert in said cylinder, a graphite plug insertable into said annular insert, a screw thread formed on the outside of said insert and extending between said cylinder and said insert and engaging said cylinder with said unit to provide a first reaction space, and another screw thread formed on the outside of said plug and extending between said annular insert and said plug and engaging the insert with the plug to provide a second reaction space.

4. In a gas reaction apparatus for reacting materials as a hydrocarbon and chlorine, a furnace, a closed shell in said furnace and heated thereby, a graphite gas reaction chamber within and spaced from said shell and including a hollow cylinder, an annular insert in said cylinder, a plug insertable into said annular insert, a screw thread formed on the outside of said insert and extending between said cylinder and said insert and engaging one with the other to provide a first reaction space, another screw thread formed on the outside of said plug and extending between said annular insert and said plug and engaging one with the other to provide a second reaction space.

5. In a gas reaction apparatus, an outer hollow graphite cylinder, an annular graphite insert in said cylinder, said insert having a head thereon closing one end thereof, a screw thread formed on said insert and extending between said cylinder and said insert, a plug insertable into said insert and having a screw thread between said plug and said insert, a first opening through said head to between said annular insert and said cylinder, and a second opening in said head to between said insert and said plug.

6. In a gas reaction apparatus, an outer hollow graphite cylinder, an annular graphite insert in said cylinder, said insert having a head thereon closing one end thereof, a screw thread formed on said insert and extending between said cylinder and said insert, said insert extending into said cylinder with a space between the open end of said insert and the bottom of the cylinder, graphite gas contact means within said annular insert partially filling said insert, an opening in said head for gases to between said cylinder and said insert, and an opening in said head for gases from said partially filled insert.

7. In a gas reaction apparatus, an outer hollow graphite cylinder, an annular graphite insert in said cylinder, said insert having a heat thereon closing one end thereof, a screw thread formed on said insert and extending between said cylinder and said insert, said insert extending into said cylinder with a space between the open end of said insert and the bottom of the cylinder, graphite chunks packed within said annular insert partially filling said insert, an opening in said head for gases to between said cylinder and said insert, and an opening in said head for gases from said partially filled insert.

HARRY BENDER.